United States Patent
Rehlaender et al.

(10) Patent No.: US 11,664,725 B2
(45) Date of Patent: May 30, 2023

(54) POWER BALANCING IN INTERLEAVED LLC CONVERTERS VIA DUTY CYCLE VARIATION

(71) Applicant: Delta Electronics (Thailand) Public Co., Ltd., Samutprakarn (TH)

(72) Inventors: Philipp Rehlaender, Paderborn (DE); Frank Schafmeister, Warburg (DE); Joachim Böcker, Berlin (DE)

(73) Assignee: DET International Holding Limited, Grand Cayman (KY)

( * ) Notice: Subject to any disclaimer, the term of this patent is extended or adjusted under 35 U.S.C. 154(b) by 0 days.

(21) Appl. No.: 17/464,229

(22) Filed: Sep. 1, 2021

(65) Prior Publication Data

US 2022/0077773 A1 Mar. 10, 2022

(30) Foreign Application Priority Data

Sep. 4, 2020 (EP) .................................. 20 194 729

(51) Int. Cl.
*H02M 3/335* (2006.01)
*H02M 3/00* (2006.01)
(Continued)

(52) U.S. Cl.
CPC ........... *H02M 3/015* (2021.05); *H02M 3/285* (2013.01); *H02M 3/3376* (2013.01); *H02M 3/33546* (2013.01); *H02M 7/4818* (2021.05)

(58) Field of Classification Search
CPC .. H02M 3/015; H02M 3/285; H02M 3/33546; H02M 3/3376; H02M 3/33523;
(Continued)

(56) References Cited

U.S. PATENT DOCUMENTS

2012/0262953 A1* 10/2012 Jungreis ............ H02M 3/33573
                                              363/21.02
2015/0229225 A1   8/2015 Jang et al.
(Continued)

FOREIGN PATENT DOCUMENTS

CN      106230268 A    12/2016
EP      2 683 066 A1    8/2014
(Continued)

OTHER PUBLICATIONS

European Search Report dated Jan. 29, 2021, 9 pages.
(Continued)

*Primary Examiner* — Adolf D Berhane
(74) *Attorney, Agent, or Firm* — Vector IP Law Group; Robert S. Babayi

(57) ABSTRACT

An interleaved LLC converter arrangement includes two or more LLC converters for transferring power from an input side to an output side, wherein the two or more LLC converters include a first LLC converter and a second LLC converter connected in parallel on the input side and on the output side and wherein each LLC converter includes a bridge inverter at the input side. For balancing the power transfer among the LLC converters if for example the second LLC converter transfers more power from the input side to the output side than the first LLC converter, each leg of the bridge of the bridge inverter of the first LLC converter is operated with a duty cycle of 0.5 and at least one leg of the bridge of the bridge inverter of the second LLC converter is operated with a duty cycle different from 0.5.

16 Claims, 5 Drawing Sheets

(51) Int. Cl.
*H02M 3/28* (2006.01)
*H02M 3/337* (2006.01)
*H02M 7/48* (2007.01)

(58) Field of Classification Search
CPC .... H02M 3/335; H02M 3/3378; H02M 3/337; H02M 3/28; H02M 1/00; H02M 7/4818
See application file for complete search history.

(56) References Cited

U.S. PATENT DOCUMENTS

| | | |
|---|---|---|
| 2018/0091059 A1 | 3/2018 | Nene |
| 2020/0195144 A1 | 6/2020 | Gekinozu |
| 2020/0328968 A1 | 10/2020 | Kanjariya et al. |

FOREIGN PATENT DOCUMENTS

| | | |
|---|---|---|
| EP | 2 683 067 A1 | 8/2014 |
| WO | 2014040170 A1 | 3/2014 |

OTHER PUBLICATIONS

Sheng Zong, et al., "Asymmetrical Duty Cycle-Controlled LLC Resonant Converter With Equivalent Switching Frequency Doubler", IEEE Transactions On Power Electronics, vol. 31, No. 7, Jul. 2016, 12 pages.

Mina Kim, et al., "Tightly Regulated Current-fed LLC Resonant Converter Employing Spread Spectrum Technique to Reduce Electromagnetic Interference", 10th International Conference on Power Electronics-ECCE Asia May 27-30, 2019 / BEXCO, Busan, Korea, 6 pages.

\* cited by examiner

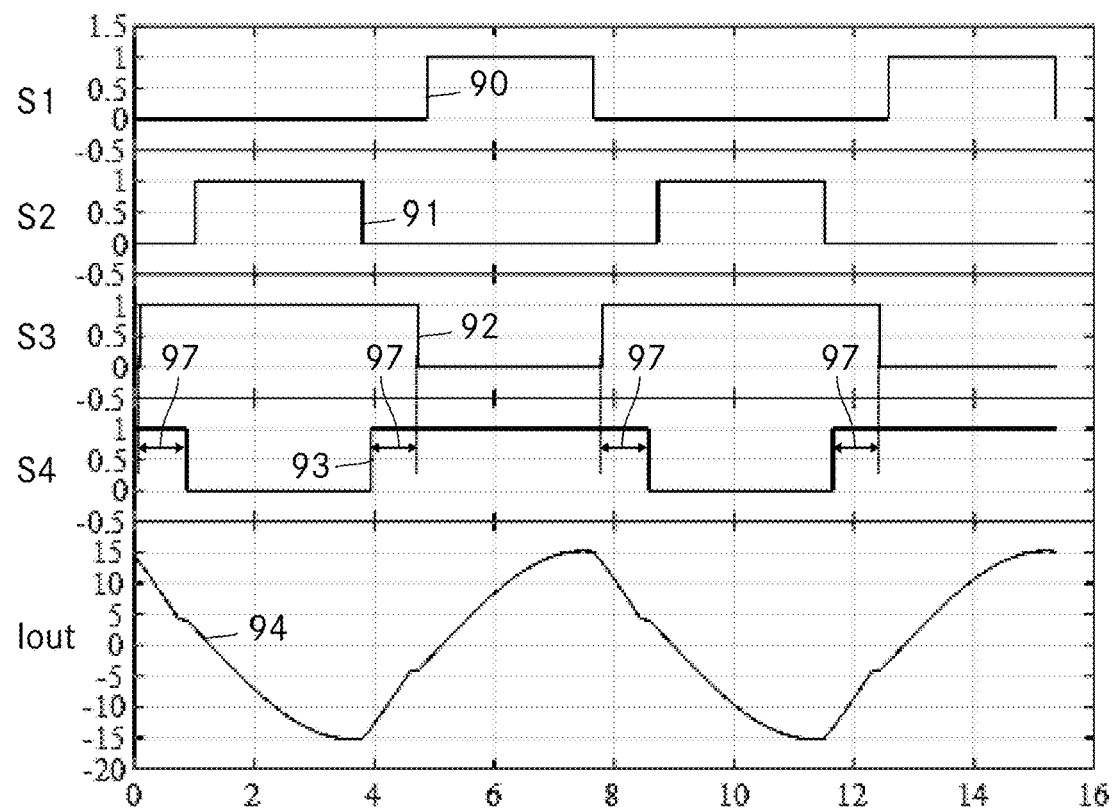
Fig. 6
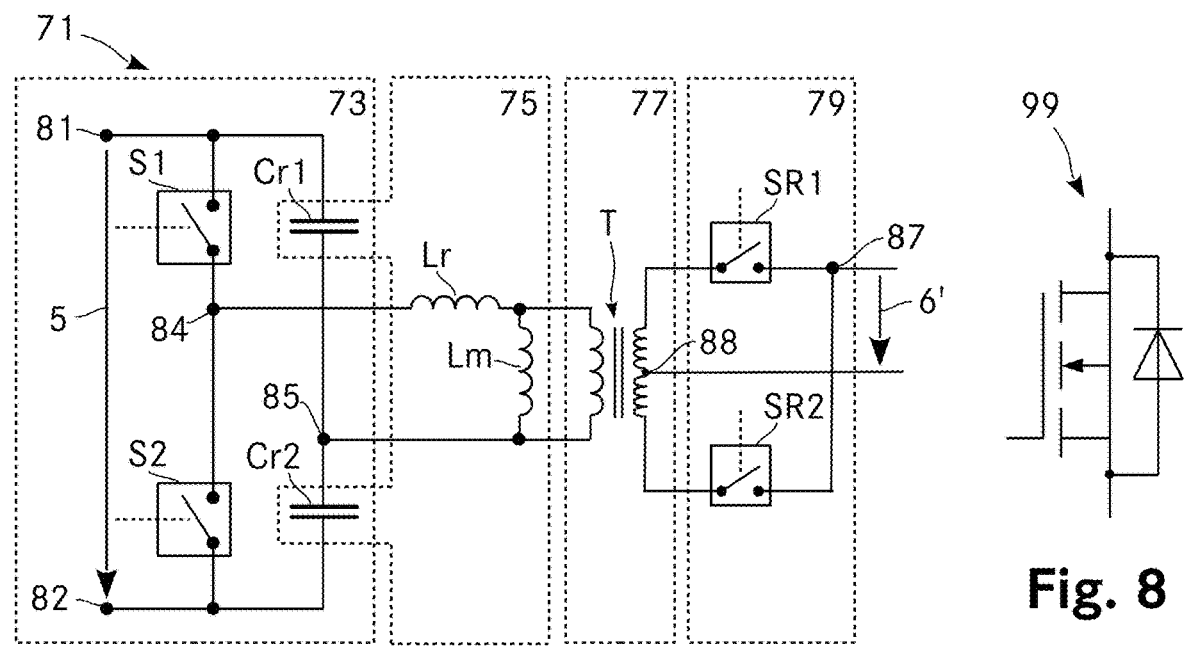
Fig. 7
Fig. 8

POWER BALANCING IN INTERLEAVED LLC CONVERTERS VIA DUTY CYCLE VARIATION

TECHNICAL FIELD

The invention relates to a method for balancing a power transfer of an interleaved LLC converter arrangement with two or more LLC converters from an input side to an output side, wherein the two or more LLC converters include a first LLC converter and a second LLC converter connected in parallel on the input side and on the output side, wherein each LLC converter includes an inverter with a bridge having one or two legs at the input side, a resonant tank connected to the inverter, a transformer with a primary and a secondary and an output rectifier, wherein the primary of the transformer is connected to the resonant tank and the output rectifier is connected to the secondary of the transformer. The invention further relates to a corresponding controller and to an interleaved LLC converter arrangement with two or more parallel LLC converters and such a controller.

BACKGROUND ART

LLC converters have become popular in recent years as they exhibit a high efficiency combined with only few components necessary. And LLC converters are usually controlled by varying the switching frequency with a fixed duty cycle of 0.5 which again reduces losses, complexity and the number of components needed.

Therefore, LLC converters have also been interleaved which means that two or more LLC converters are connected in parallel at the input and that are connected in parallel at the output. Accordingly, interleaved LLC converters usually have a single power input and a single power output where the output current is supplied to an output capacitor that is connected across the paralleled output.

An LLC converter usually includes an inverter at the input side, a resonant tank connected to the inverter followed by a transformer and an output rectifier connected to the transformer output.

The inverter can be a full bridge inverter or a half bridge inverter. The resonant tank typically includes a resonating inductance connected in series with the inverter, a magnetizing inductance connected in parallel across the inverter output and a resonating capacitance connected in series with the inverter. These components may include either discrete inductors and capacitors or other inductive or capacitive components of other circuit elements or combinations thereof. The resonating inductance for example usually includes leakage components of the transformer and the magnetizing inductance often includes components of the transformer magnetizing inductance.

When using a half bridge inverter, the resonant capacitor may be split such that a resonant capacitor part is arranged between each of the two inverter input terminals and one of the transformer input terminals and where the other transformer input terminal is connected to a centre tap of the inverter output via a resonant inductor.

Several options are also available for the output rectifier. A centre tapped rectification is possible as well as a full bridge rectification. And the rectifier may be assembled using diodes or synchronous rectifiers with transistors.

When for example using N parallel LLC-converters, an operation with equal frequency and a phase shift of 180/N° is preferred. This substantially reduces the current ripple at the output capacitance (ripple cancellation or current ripple cancellation). If such paralleled LLC converters are operated with a different frequency, such an interleaving leading to such a ripple cancellation is not possible.

However, due to component tolerances the single components of the different LLC converters differ from each other wherefore the transfer behaviour of the single LLC converters also differs from converter to converter. Accordingly, the single LLC converters do not necessarily transfer the same power when operating them with a duty cycle of 0.5 at the same frequency. This may result in higher losses and may even prevent operation of such paralleled LLC converters.

Accordingly, for operation with an equal switching frequency an active or passive power transfer balancing is necessary.

A power balancing in interleaved LLC converters may be achieved through different techniques.

One of them is a phase shift modulation such as for example disclosed in document EP 2 683 066 A1. This balancing method may however only be used in interleaved LLC converters having a full bridge inverter at the input.

In a different configuration where the LLC converters do include separate source converters at their inputs, the power transfer may be balanced by balancing the input power such as for example disclosed in document EP 2 683 067 A1.

Document CN 106230268 discloses another configuration with separate source converters wherein the LLC converters are connected in series on the input side across a single input voltage. Accordingly, each LLC converter is only supplied by a fraction of the input voltage. If one of the converters supplies more power than another, its input voltage is reduced wherefore the input voltage of the other converters is increased resulting in a passive power transfer balancing.

However, the configurations with separate source converters may not be applied in cases where the LLC converters are connected in parallel at the input and at the output side.

Document WO 2014/040170 discloses a balancing method wherein switch-controlled capacitors are used to overcome load sharing problems. This method however requires additional components to achieve power balancing.

Document US 2015/0229225 A1 discloses another balancing method wherein balancing is achieved via suitable control of a full wave synchronous output rectifier in the secondary. This method however not only increases control complexity but also requires full wave synchronous output rectification and may accordingly not be used in cases where half wave rectification or diode rectification is to be used.

SUMMARY OF THE INVENTION

Accordingly, it is the object of the invention to create a method for balancing the power transfer in an interleaved LLC converter arrangement pertaining to the technical field initially mentioned, that may be applied to LLC converters that are connected in parallel at the input side and at the output side, that may be applied to LLC converters with full bridge or half bridge inverters at the input side, that do not require additional components and may be applied independent of the structure of the output rectifier. Further objects of the invention are to create a corresponding controller as well as an interleaved LLC converter arrangement including such a controller.

The solution of the invention is specified by the features of claim 1. According to the invention, balancing of the power transfer is achieved by operating each leg of the bridge of the inverter of the first LLC converter with a duty cycle of 0.5 and operating at least one leg of the bridge of the inverter of the second LLC converter that transfers more power from the input side to the output side than the first LLC converter with a duty cycle different from 0.5.

This leg or these legs are also designated as an asymmetric leg or as asymmetric legs further below. Accordingly, such a leg is designated as being operated asymmetrically and an LLC converter that includes at least one asymmetric leg is designated as being operated asymmetrically too, whether or not all or just one single leg of the LLC converter is an asymmetric leg.

The term leg as used herein denotes a branch of a bridge of the inverter of an LLC converter including two switches connected in series, wherein an upper switch of the leg is connected to a positive input terminal of the inverter, the lower switch is connected to the negative terminal of the interver and both switches are connected to a common centre tap. A full bridge inverter typically includes two such legs and the output of the inverter is formed by both centre taps of the two legs. A half bridge inverter typically includes a single leg with an upper switch and a lower switch. An additional branch often is formed by the two split capacitors of the resonant tank wherein an upper capacitor is connected to the positive input terminal of the inverter, the lower capacitor is connected to the negative terminal of the interver and both capacitors are connected to a common centre tap. In this case the output of the half bridge inverter is formed by the centre tap of the leg with the switches and the centre tap of the branch with the split resonant tank capacitors.

The term operating a leg in this connection means operating the switches of that leg with a particular duty cycle wherein the duty cycle for operating a first switch of a leg may be the same or may differ from the duty cycle of the second switch of that leg.

Regarding the particular values of the duty cycle as mentioned above, such as for example the value of 0.5, it is to say that the actual duty cycle applied to the switches may slightly differ from the given value, in order to avoid simultaneous ON times of the switches in the same leg.

In that at least one leg of the LLC converter that transfers more power than another LLC converter is operated with a duty cycle different from 0.5 (also designated as asymmetric operation further below), the power transfer of that LLC converter is reduced which results in a balanced power transfer. Since balancing is achieved by a simple duty cycle variation, it may be applied to interleaved LLC converters that are connected in parallel not only on the output side but also on the input side. Moreover, this balancing method may be applied to interleaved LLC converter configurations that do include three or more paralleled LLC converters. And this method does not require any additional components as the switches of the inverters do have to be controlled anyway. It just requires a different method to determine the control signals for the switches. The method may also be applied to more than one LLC converter such that those LLC converters that transfer most power may be operated asymmetrically at the same time resulting in a fast balancing of the output power of the LLC converters.

In an interleaved LLC converter arrangement with N paralleled LLC converters that are balanced in this way, all LLC converters may be operated with equal frequencies and with a phase shift of 180°/N which allows to benefit from a good ripple cancellation across the output capacitor.

The duty cycle of such an asymmetric leg is preferably between 0.1 and 0.45, more preferably between 0.25 and 0.4.

Preferably, not all switches of an asymmetric leg are operated with the same duty cycle different from 0.5. Rather a first switch of an asymmetric leg is operated with a duty cycle that is greater than 0.5 and a second switch of that asymmetric leg is operated with a duty cycle that is smaller than 0.5. In order to avoid undefined states or critical transitions when switching the switches from one state to another, the deviation of the two duty cycles from 0.5 preferably is similar but not the same.

As outlined further above, the invention may be applied in LLC converters with a full bridge or a half bridge inverter at the input. Accordingly, in a preferred embodiment of the invention, the bridge of the inverter of the second LLC converter is a half bridge that is formed by said at least one asymmetric leg. In this case, it is further preferred that the inverter of the other LLC converters of the interleaved LLC converter arrangement do have the same structure and therefore do include a half bridge inverter as well. However, the other LLC converter or converters may generally also have a different structure and different bridge inverters such as for example a full bridge inverter.

And in another preferred embodiment of the invention, the bridge of the inverter of the second LLC converter is a full bridge wherein a first leg of said full bridge is formed by said at least one asymmetric leg.

In this case, it is again further preferred that the inverter of the other LLC converters of the interleaved LLC converter arrangement do have the same structure and therefore do include a full bridge inverter as well. However, the other LLC converter or converters may generally also have a different structure and different bridge inverters such as for example a half bridge inverter.

The other leg, also designated as the second leg of the full bridge inverter of the second LLC converter, that includes the asymmetric leg may be operated in different ways. It may be operated with a duty cycle of 0.5 or it may be operated with a duty cycle different from 0.5 as well. Both embodiments are possible and preferred. In the latter embodiment, the duty cycles for the switches of the second leg may be the same as those of the switches of the asymmetric leg. The duty cycles for the switches of the second leg may however also chosen to be different from those of the switches of the asymmetric leg.

In the case of a full bridge inverter of an LLC converter that includes the asymmetric leg, the switches of the full bridge inverter may be operated without freewheeling intervals such that the corresponding switches of the two legs do not conduct at the same time.

In a preferred embodiment of the invention, the first and the second leg are operated such as to provide at least one freewheeling interval. I.e. the switches of such a full bridge inverter are operated such that the corresponding switches of the two legs do conduct at the same time resulting in freewheeling intervals. For example, the upper switch of the first leg and the upper switch of the second leg may be operated to have overlapping ON times, such that a freewheeling current may flow through one of these upper switches, through the resonant tank, the transformer primary, the other one of these upper switches and back to the first one of the upper switches. Of course, freewheeling intervals may also be achieved in operating the lower switches of the two legs with overlapping ON times.

As already mentioned above, the paralleled LLC converters of an interleaved LLC converter arrangement preferably have the same kind of inverter, either all have a full bridge inverter or all have a half bridge inverter.

Accordingly, in an interleaved LLC converter arrangement wherein the asymmetrically operated LLC converter includes a full bridge inverter, the other LLC converter or the other LLC converters do preferably also include a full bridge inverter. And accordingly, both legs of the full bridge inverter of at least one of these other LLC converters are preferably operated with a duty cycle of 0.5.

The switch control signals for the switches of the bridge inverters are usually generated by a controller which may apply any suitable control method such as for example PID control. Such a control may either be an open or a closed loop control.

In a preferred embodiment of the invention, the switch control signals for operating the at least one leg are generated using a closed PI control loop that is based on a feedback of an output current of each LLC converter. The controller may however also be based on a feedback of the input currents of the LLC converters. The term PI thereby refers to proportional-integral as known in the art. Therefore, based on a feedback of the LLC converter output currents a PI compensator determines the duty cycle for the switches of the LLC converters, generates the respective control signals and provides these control signals to the switches to switch them ON and OFF accordingly. It would also be possible to use a pure I compensator, i. e. without the proportional and the derivative components, or more generally, compensators with a similar structure as a PID compensator may be used.

In another preferred embodiment of the invention, the output power of the interleaved LLC converter arrangement is provided across an output capacitor connected across the output side.

The invention further relates to a controller for balancing the power transfer of an interleaved LLC converter arrangement with two or more LLC converters from an input side to an output side, wherein the two or more LLC converters include a first LLC converter and a second LLC converter connected in parallel on the input side and on the output side, each LLC converter including an inverter with a bridge having one or two legs at the input side, a resonant tank connected to the inverter, a transformer with a primary and a secondary and an output rectifier, the primary of the transformer being connected to the resonant tank and the output rectifier being connected to the secondary of the transformer.

According to the invention, the controller is adapted to balance the power transfer by operating each leg of the bridge of the inverter of the first LLC converter with a duty cycle of 0.5 and operating at least one leg of the bridge of the inverter of the second LLC converter that transfers more power from the input side to the output side than the first LLC converter with a duty cycle different from 0.5.

Preferably, the controller is adapted to generate respective control signals for each switch of the bridge of the inverter of the first LLC converter as well as for each switch of the bridge of the inverter of the second LLC converter and to provide these control signals to a respective control input of said switches. Accordingly, the interleaved LLC converter arrangement includes a single controller that generates and provides the control signals for all the switches of each bridge inverter.

The controller may however be also adapted to generated and provide the control signals for only a part of the switches of the bridge inverters whereas an additional controller generates and provides the control signals for the other switches of the bridge inverters. Or each LLC converter of the interleaved LLC converter arrangement includes his own controller that generates and provides the control signals for the switches of its own bridge inverter.

As mentioned above, control of the interleaved LLC converter arrangement may be based on different feedback signals such as for example the input currents of the LLC converters.

In a preferred embodiment of the invention, control is however based on a feedback of the output currents of the LLC converters. In the case of an interleaved LLC converter arrangement with two LLC converters, the controller therefore preferably includes a first input to receive information representative of an output current of the first LLC converter and a second input to receive information representative of an output current of the second LLC converter and the controller is adapted to generate the control signals in dependency of the information received at the first and second input.

If the interleaved LLC converter arrangement includes more than two LLC converters, the controller accordingly includes an input for each LLC converter and is adapted to generate the control signals in dependency of the information received at each of these inputs.

The invention further relates to an interleaved LLC converter arrangement for transferring power from an input side to an output side, including a first LLC converter and a second LLC converter connected in parallel on the input side and on the output side, and wherein each LLC converter includes an inverter with a bridge having one or two legs at the input side, a resonant tank connected to the inverter, a transformer with a primary and a secondary and an output rectifier wherein the primary of the transformer is connected to the resonant tank and the output rectifier is connected to the secondary of the transformer According to the invention, the interleaved LLC converter arrangement includes a controller according to the invention as described hereinbefore.

In a further preferred embodiment of the invention, the interleaved LLC converter arrangement includes an output capacitor connected across the output side of the interleaved LLC converter across with the output power of the interleaved LLC converter arrangement is provided.

Other advantageous embodiments and combinations of features come out from the detailed description below and the entirety of the claims.

BRIEF DESCRIPTION OF THE DRAWINGS

The drawings used to explain the embodiments show:

FIG. 6 a schematic timing diagram of some values of another embodiment of the invention with freewheeling intervals;

FIG. 7 a more detailed representation of an LLC converter with a half bridge inverter for use in the invention;

FIG. 8 a schematic representation of a transistor for use as a switch in an inverter and in an output rectifier of an LLC converter according to the invention;

In the figures, the same components are given the same reference symbols.

PREFERRED EMBODIMENTS

Figure 1:
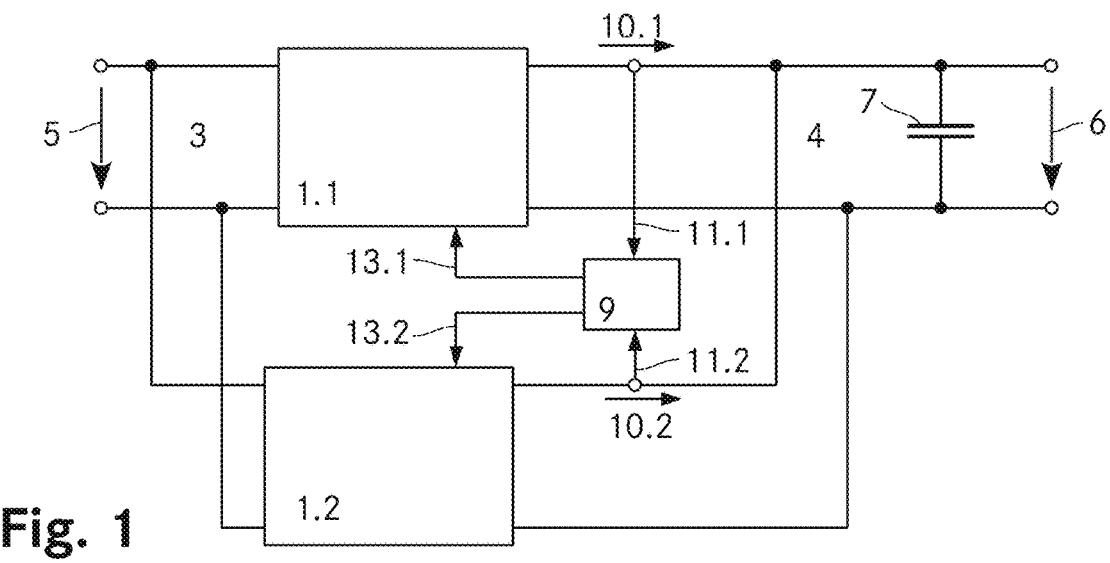
FIG. 1 an embodiment of the invention with two interleaved LLC converters.

FIG. 1 shows an embodiment of the invention with two interleaved LLC converters 1.1, 1.2. Both LLC converters 1.1, 1.2 are connected in parallel. I. e. they are connected in parallel on the input side 3 and they are connected in parallel on the output side 4. An input voltage 5 is provided to the input side 3 and on the output side 4 an output voltage 6 is provided across an output capacitor 7.

The converter arrangement with the two interleaved LLC converters 1.1, 1.2 further includes a controller 9 that receives two input signals 11.1, 11.2 where the input signal 11.1 is representative of the output current 10.1 of the first LLC converter 1.1 and where the input signal 11.2 is representative of the output current 10.2 of the second LLC converter 1.2. The output currents 10.1, 10.2 are determined as known in the art for example by means of current transformers or other measurement devices for measuring a current.

Based on these input signals 11.1, 11.2 the controller 9 generates the switch control signals 13.1, 13.2 for balancing a power transfer of the two LLC converters 1.1, 1.2 and provides these switch control signals 13.1, 13.2 to the LLC converters 1.1, 1.2. It is to note that each of the switch control signals 13.1, 13.2 may include one or more switch control signals where each of them may be used to control only a part of the switches of the inverters of the LLC converters 1.1, 1.2.

Assuming that the second LLC converter 1.2 is transferring more power from the input side 3 to the output side 4 than the first LLC converter 1.1, the LLC converter 1.2 is operated in an asymmetric mode according to the invention thereby actively reducing the power transfer of the second LLC converter 1.2 and accordingly balancing the output power of the two LLC converters 1.1, 1.2. This means that at least one of the switch control signals 13.2 for the switches of the inverter of LLC converter 1.2 is suited to asymmetrically control at least one leg of the inverter of LLC converter 1.2.

The controller 9 may also receive further input signals that are considered when generating the switch control signals 13.1, 13.2. The controller 9 may also perform other task such as power transfer control or other tasks. The controller 9 may also be divided into two separate controllers that each controls the switches of one of the LLC converters 1.1, 1.2. In this case, both separate controllers do receive the two input signals representing the output currents 10.1, 10.2 of the single LLC converters 1.1, 1.2.

The converter arrangement shown in FIG. 1 may also include further LLC converters connected in parallel to the LLC converters 1.1, 1.2.

Figure 2:
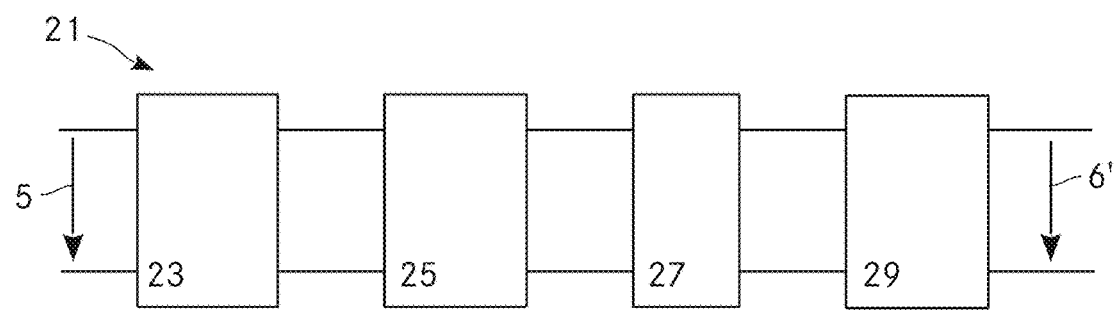
FIG. 2 a general representation of an LLC converter.

FIG. 2 shows a general representation of an LLC converter 21. The LLC converter 21 includes an inverter 23 at its input that receives an input voltage 5, a resonant tank 25, a transformer 27 and an output rectifier 29 which provides the output voltage 6' of the LLC converter 21.

Two or more such LLC converters may be connected in parallel such as to provide an interleaved LLC converter arrangement with a common input voltage 5 and a combined output voltage provided across a common output capacitor (not shown in FIG. 2), where the output voltage 6' of each LLC converter is connected in parallel.

Figure 3:
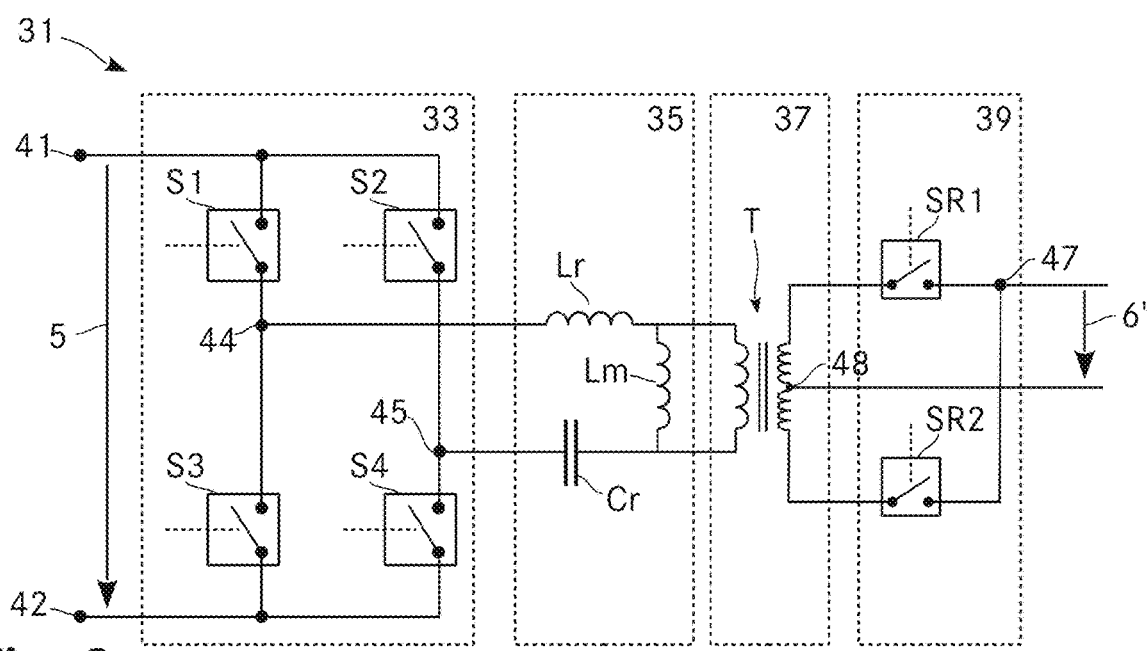
FIG. 3 a more detailed representation of an LLC converter with a full bridge inverter for use in the invention.

FIG. 3 shows a more detailed, exemplary representation of an LLC converter 31 with a full bridge inverter 33 for use in the invention. The full bridge inverter 33 is arranged at the input side of the LLC converter 31 and receives an input voltage 5 connected to two input terminals 41, 42. The full bridge inverter 33 includes two branches or legs of switches. A first branch includes the switches S1 and S3 that are connected in series between the two input terminals 41, 42 of the LLC converter 31 and a second branch includes the switches S2 and S4 that are also connected in series between the two input terminals 41, 42 of the LLC converter 31. The output of the full bridge inverter 33 is provided between the centre tap 44 of the first branch and the centre tap 45 of the second branch. The switches S1, S2, S3, S4 are controllable switches.

A resonant tank 35 is connected to the output of the full bridge inverter 33 and includes a resonant inductance Lr connected to a first input terminal of the resonant tank 35, a resonating capacitor Cr connected to a second input terminal of the resonant tank 35 and a magnetizing inductance Lm connected across the output of the resonant tank 35.

The resonant tank 35 is followed by a transformer T which has a centre tap 48 in its secondary.

The outer terminals of the transformer secondary are connected to a rectifier 39 including two synchronous rectifiers SR1, SR2 each connected to a different one of the outer transformer terminals. The other terminals of the synchronous rectifier switches SR1, SR2 are connected to a first output terminal 47 of the rectifier and therewith also of the LLC converter 31. The centre tap 48 of the transformer T is the second output terminal of the rectifier 39 and accordingly also of the LLC converter 31.

Whereas the output rectifier is shown as a centre-tapped full wave rectifier, the rectifier may, depending on the particular application, also be implemented as a full wave bridge rectifier with four rectifying elements. Or the rectifier may be implemented as a half wave rectifier.

And all or a part of the rectifying elements, i. e. in the example shown in FIG. 3 of the synchronous rectifier switches SR1, SR2, may also be replaced by diodes.

Assuming an interleaved LLC converter arrangement with two LLC converters each including a full bridge inverter such as for example shown in FIG. 3. In this example, the second LLC converter does transfer more power than the first LLC converter. According to the invention, the first LLC converter is operated with a duty cycle of 0.5, which means that all four switches of the full bridge inverter of the first LLC converter are operated with a duty cycle of 0.5. Now, in order to balance the power transfer of the two LLC converters, at least one leg of the full bridge inverter of the second LLC converter is operated with a duty cycle different from 0.5.

In one example just a single leg of the second full bridge inverter is operated with a duty cycle different from 0.5. Particularly, one of the switches of that leg is switched ON and OFF with a duty cycle greater than 0.5 and the other one of the switches of that leg is switched ON and OFF with a duty cycle smaller than 0.5.

Figure 4:
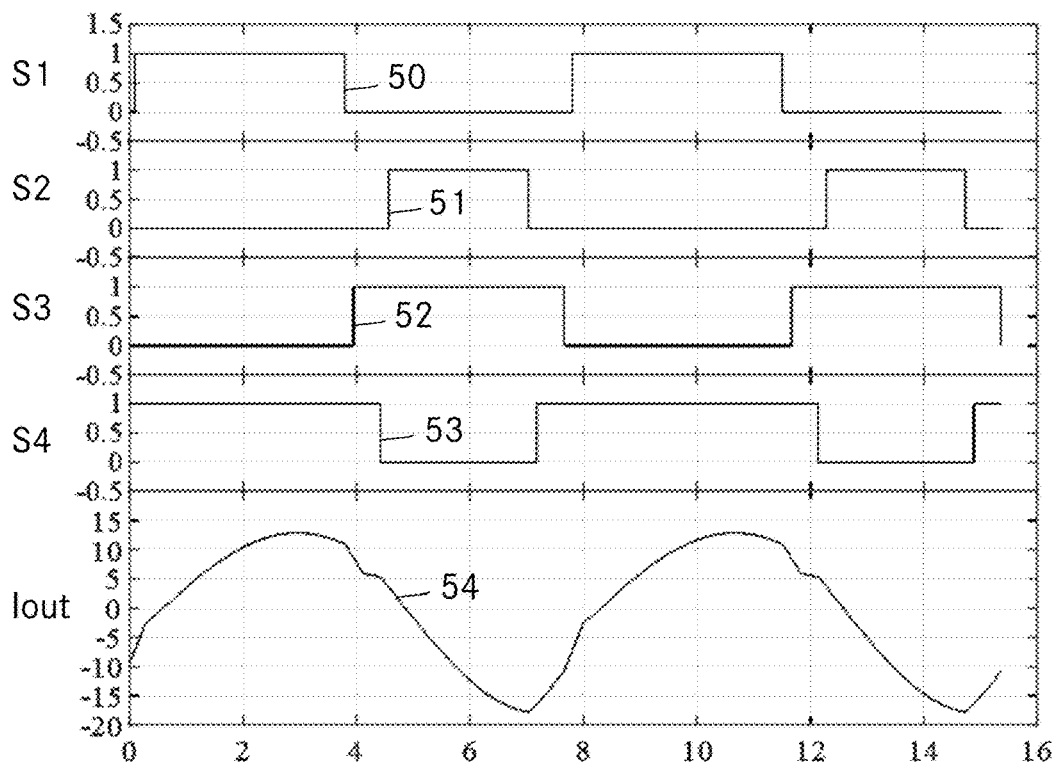
FIG. 4 a schematic timing diagram of some values of another embodiment of the invention with an LLC converter having a full bridge inverter.

FIG. 4 shows a schematic timing diagram of the ON and OFF times of the four switches S1, S2, S3, S4 of the asymmetrically operated full bridge inverter. The asymmetrically operated leg includes switches S2 and S4 and the symmetrically operated leg includes switches S1 and S3. Line 50 shows the ON and OFF time of switch S1, line 51 shows the ON and OFF time of switch S2, line 52 shows the ON and OFF time of switch S3 and line 53 shows the ON and OFF time of switch S4. As can be seen in FIG. 4, the duty cycle of switches S1 and S3 is 0.5, the duty cycle of switch S2 is about 0.35 and the duty cycle of switch S4 is about 0.65.

Taking a closer look, it can be noticed that the duty cycle of switch S2 is slightly below 0.35 and the one of switch S4 slightly below 0.65 so that switch S4 is switched OFF shortly before switch S2 is switched ON and vice versa.

FIG. 4 further shows the resulting output current Tout of the interleaved LLC converter arrangement as line 54.

The ordinate axis shows the time in microseconds and the abscissa axes show the states of the switches with 0=OFF and 1=ON or for the output current Tout the amount of current in amperes.

Figure 5:
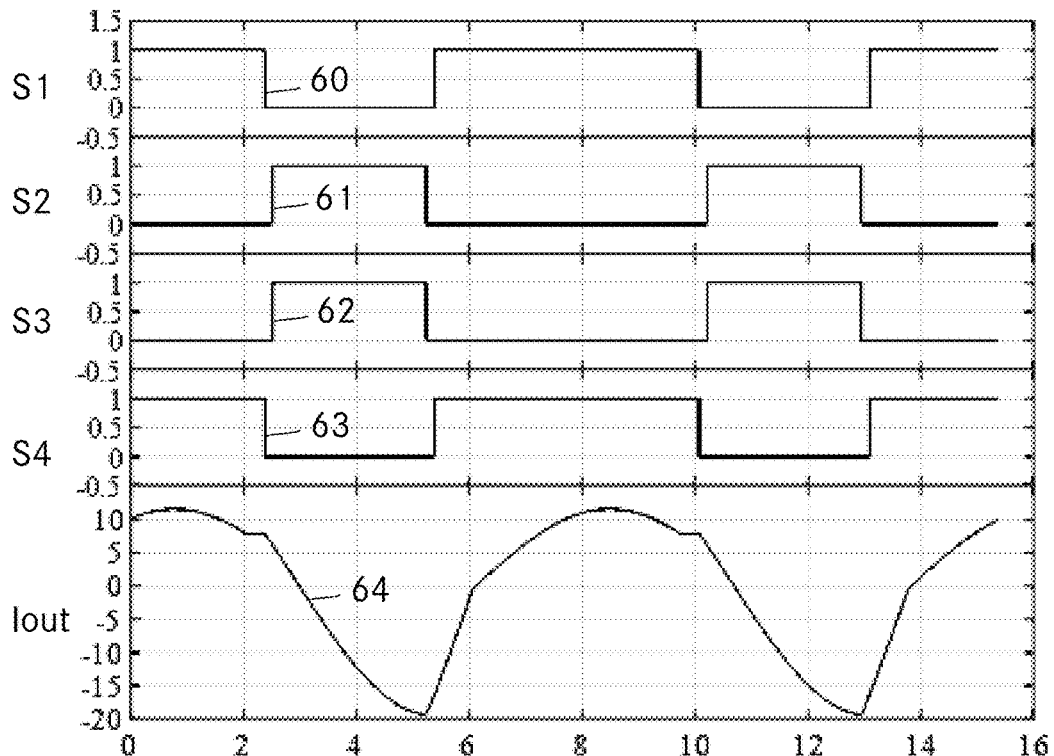
FIG. 5 a schematic timing diagram of some values of a further embodiment of the invention with an LLC converter having a full bridge inverter.

FIG. 5 shows another example where both legs of the second full bridge inverter are operated asymmetrically with a duty cycle different from 0.5. Particularly, the upper switch of the first leg and the lower switch of the second leg are operated with a duty cycle greater than 0.5 and the lower switch of the first leg and the upper switch of the second leg are operated with a duty cycle smaller than 0.5.

FIG. 5 shows a schematic timing diagram of the ON and OFF times of the four switches S1, S2, S3, S4 in this example. The first asymmetrically operated leg includes switches S1 and S3 and the second asymmetrically operated leg includes switches S2 and S4. Line 60 shows the ON and OFF time of switch S1, line 61 shows the ON and OFF time of switch S2, line 62 shows the ON and OFF time of switch S3 and line 63 shows the ON and OFF time of switch S4. In the example shown in FIG. 5, the duty cycle of switches S1 and S4 is about 0.38 and the duty cycle of switches S2 and S3 is about 0.62.

Taking a closer look, it can be noticed that the duty cycles of switches S2 and S3 is slightly below 0.38 and the one of switches S1 and S4 slightly below 0.62 so that switches S1 and S4 are switched OFF shortly before switches S2 and S3 are switched ON and vice versa.

FIG. 5 further shows the resulting output current Tout of the interleaved LLC converter arrangement as line 64.

The ordinate axis shows the time in microseconds and the abscissa axes show the states of the switches with 0=OFF and 1=ON or for the output current Tout the amount of current in amperes.

FIG. 6 shows a further example where both legs of the second full bridge inverter are operated asymmetrically with a duty cycle different from 0.5. In this example, the upper switch of the first leg and the upper switch of the second leg are operated with a duty cycle smaller than 0.5 and the lower switch of the first leg and the lower switch of the second leg are operated with a duty cycle greater than 0.5.

FIG. 6 shows a schematic timing diagram of the ON and OFF times of the four switches S1, S2, S3, S4 in this example. The first asymmetrically operated leg includes switches S1 and S3 and the second asymmetrically operated leg includes switches S2 and S4. Line 90 shows the ON and OFF time of switch S1, line 91 shows the ON and OFF time of switch S2, line 92 shows the ON and OFF time of switch S3 and line 93 shows the ON and OFF time of switch S4. In the example the duty cycle of switches S1 and S2 is about 0.38 and the duty cycle of switches S3 and S4 is about 0.62.

Taking a closer look, it can be noticed that the duty cycles of switches S3 and S4 is slightly below 0.62 and the one of switches S1 and S2 slightly below 0.38 so that switches S1 and S4 are switched OFF shortly before switches S2 and S3 are switched ON and vice versa.

In this example however, the control signals for switching the switches are chosen such that the ON time of switch S3 starts before the ON time of switch S4 ends and such that the ON time of switch S4 starts before the ON time of switch S3 ends. These overlapping ON times of switches S3, S4 are shown as the freewheeling intervals 97 in FIG. 6.

FIG. 6 further shows the resulting output current Tout of the interleaved LLC converter arrangement as line 94.

The ordinate axis shows the time in microseconds and the abscissa axes show the states of the switches with 0=OFF and 1=ON or for the output current Tout the amount of current in amperes.

FIG. 7 shows a more detailed, exemplary representation of an LLC converter 71 with a half bridge inverter 73 for use in the invention. The half bridge inverter 73 is arranged at the input side of the LLC converter 71 and receives an input voltage 5 connected to two input terminals 81, 82. The half bridge inverter 73 includes a single branch or leg of switches. The branch includes the switches S1 and S2 that are connected in series between the two input terminals 81, 82 of the LLC converter 71. A centre tap 84 is provided between the two switches S1, S2.

A resonant tank 75 is connected to the output of the half bridge inverter 73 and includes a resonant inductance Lr connected to a first input terminal of the resonant tank 75 which itself is connected to the centre tap 84. The other terminal of the resonant inductance Lr is connected to a first output terminal of the resonant tank. A magnetizing inductance Lm is connected across the output of the resonant tank 75, i. e. to the first output terminal and a second output terminal of the resonant tank 75. The resonant tank 75 further includes a resonant capacitor which is split into two separate resonant capacitors Cr1, Cr2 in this example. Resonant capacitor Cr1 is connected between the first input terminal 81 and a centre tap 85 which itself is connected to the second output terminal of the resonant tank 75. And resonant capacitor Cr2 is connected between the second input terminal 82 and the centre tap 85.

The output of the half bridge inverter 73 is provided between the centre tap 84 of the first branch of switches and the centre tap 85 of a second branch that includes the two resonant capacitors Cr1, Cr2. The switches S1, S2 are controllable switches.

The resonant tank 75 is followed by a transformer T which has a centre tap 88 in its secondary.

The outer terminals of the transformer secondary are connected to a rectifier 79 including two synchronous rectifiers SR1, SR2 each connected to a different one of the outer transformer terminals. The other terminals of the synchronous rectifier switches SR1, SR2 are connected to a first output terminal 87 of the rectifier and therewith also of the LLC converter 71. The centre tap 88 of the transformer T is the second output terminal of the rectifier 79 and accordingly also of the LLC converter 71.

Whereas the output rectifier is shown as a centre-tapped full wave rectifier, the rectifier may, depending on the particular application, also be implemented as a full wave bridge rectifier with four rectifying elements. Or the rectifier may be implemented as a half wave rectifier.

And all or a part of the rectifying elements, i. e. in the example shown in FIG. 7 of the synchronous rectifier switches SR1, SR2, may also be replaced by diodes.

FIG. 8 schematic shows a transistor suitable for use as a switch in an inverter and in an output rectifier of an LLC converter according to the invention. The transistor shown in FIG. 8 is an N-channel MOSFET 99 of the enhancement type. Also shown is the body diode of the transistor which provides a path for a freewheeling current when the MOSFET 99 is connected with inductive loads, for example an LLC converter as in the invention.

Depending on the particular application, other electrically controllable switches such as other transistors may however be used as well.

Now assuming an interleaved LLC converter arrangement with two LLC converters each including a half bridge inverter such as for example shown in FIG. 7. In this example, the second LLC converter does transfer more power than the first LLC converter. According to the invention, the first LLC converter is operated with a duty cycle of 0.5, which means that both switches of the half bridge inverter of the first LLC converter are operated with a duty cycle of 0.5. Now, in order to balance the power transfer of the two LLC converters, both switches of the single leg of the half bridge inverter of the second LLC converter are operated with a duty cycle different from 0.5. Particularly, one of the switches of that leg is switched ON and OFF with a duty cycle greater than 0.5 and the other one of the switches of that leg is switched ON and OFF with a duty cycle smaller than 0.5.

Figure 9:
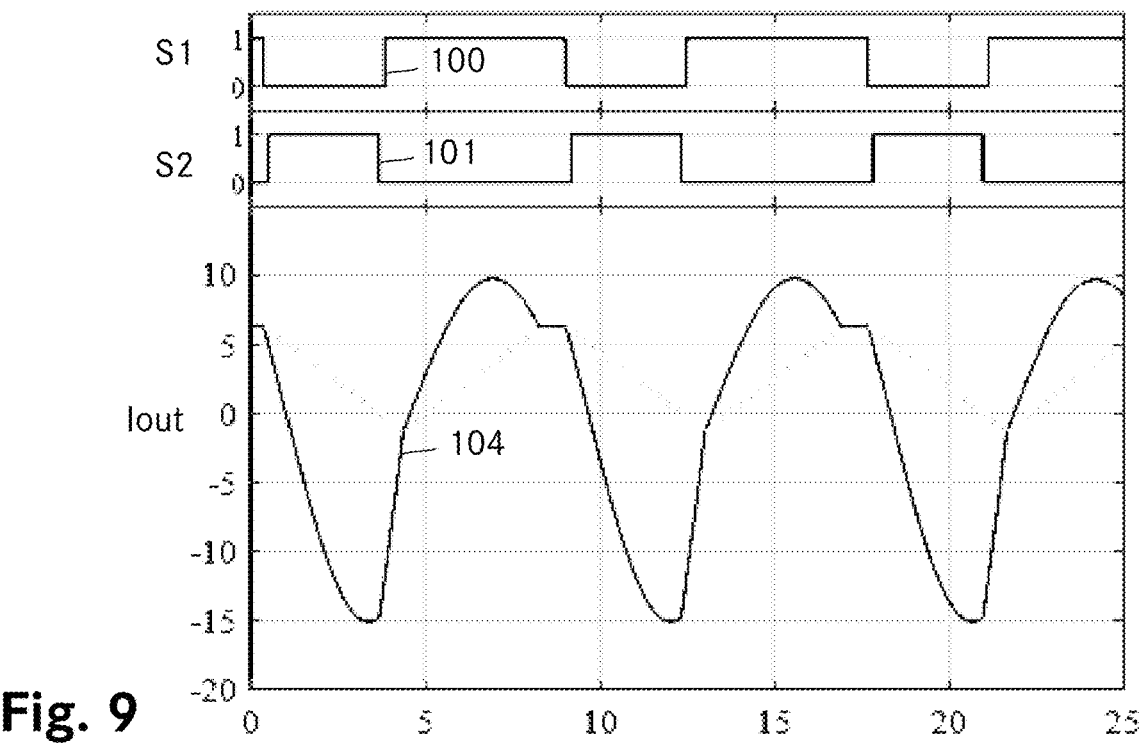
FIG. 9 a schematic timing diagram of some values of an embodiment of the invention with an LLC converter having a half bridge inverter.

FIG. 9 shows a schematic timing diagram of the ON and OFF times of the two switches S1, S2 of the asymmetrically operated half bridge inverter. Line 100 shows the ON and OFF time of switch S1 and line 101 shows the ON and OFF time of switch S2. As can be seen in FIG. 9, the duty cycle of switch S1 is about 0.38 and the duty cycle of switch S2 is about 0.62.

Again, the duty cycle of switch S2 is slightly below 0.38 and the one of switch S1 slightly below 0.62 so that switch S2 is switched OFF shortly before switch S1 is switched ON and vice versa.

FIG. 9 further shows the resulting output current Tout of the interleaved LLC converter arrangement as line 104.

The ordinate axis shows the time in microseconds and the abscissa axes show the states of the switches with 0=OFF and 1=ON or for the output current Tout the amount of current in amperes.

Figure 10:
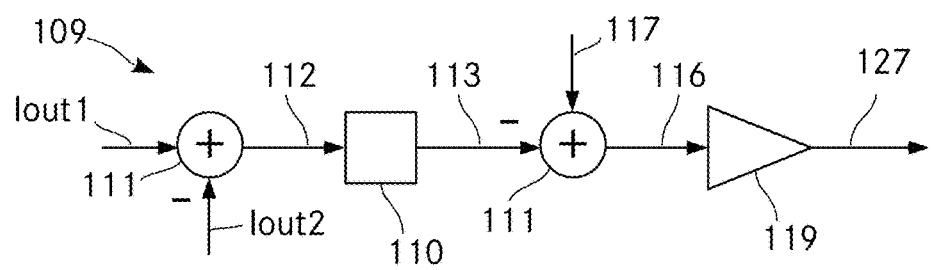
FIG. 10 a schematic representation of the general structure of a controller according to the invention.

FIG. 10 shows the general structure of a controller 109 according to the invention. In this embodiment, the controller is adapted to control the power transfer of two parallel arranged LLC converters. The output current Iout1, Iout2 of each of the two converters serves as an input for the controller 109, where the output currents Iout1, Iout2 are usually averaged values of the respective currents. An adder 111 forms an error signal 112 by determining the difference of the two output currents Iout1 and Iout2. This error signal 112 is fed to a PI compensator 110 which provides the bipolar duty cycle value 113 based on the error signal 112. A further adder 111 forms a comparison signal 116 by subtracting the bipolar duty cycle value 113 from a carrier signal 117. The carrier signal 117 is a regular triangular signal having a particular frequency. The comparison signal 116 is fed to a comparator 119 that produces one or more switch control signals 127 for controlling a switching of the switches of the input inverters of the LLC converters. The frequency of the carrier signal determines the frequency of the control signals and thus the switching frequency of the inverters of the LLC converters.

A particular switch control signal 127 is for example produced by the comparator 119 by outputting a positive signal if the corresponding comparison signal 116 is above zero and outputting a zero signal if the corresponding comparison signal 116 is below zero.

Depending on the particular application of the controller 109, at least two switch control signals 127 are provided at the output of the controller 109. One of these switch control signals 127 is used for controlling the switches of one leg of the bridge of an inverter of one of the LLC converters having a duty cycle different from 0.5 and the other one of the switch control signals 127 is used for controlling the switches of one leg of the bridge of an inverter of the other one of the LLC converters having a duty cycle of 0.5. The different switch control signals 127 are produced by using different carrier signals. Thereby, the different carrier signals just differ from each other in that they are shifted against each other by a certain angle. That angle usually is 90° or a multiple thereof.

Although the controller 109 uses the output currents of the LLC converters as input, it is also possible that the averaged input current of each of the two converters is used as an input for the controller 109.

Figure 11:
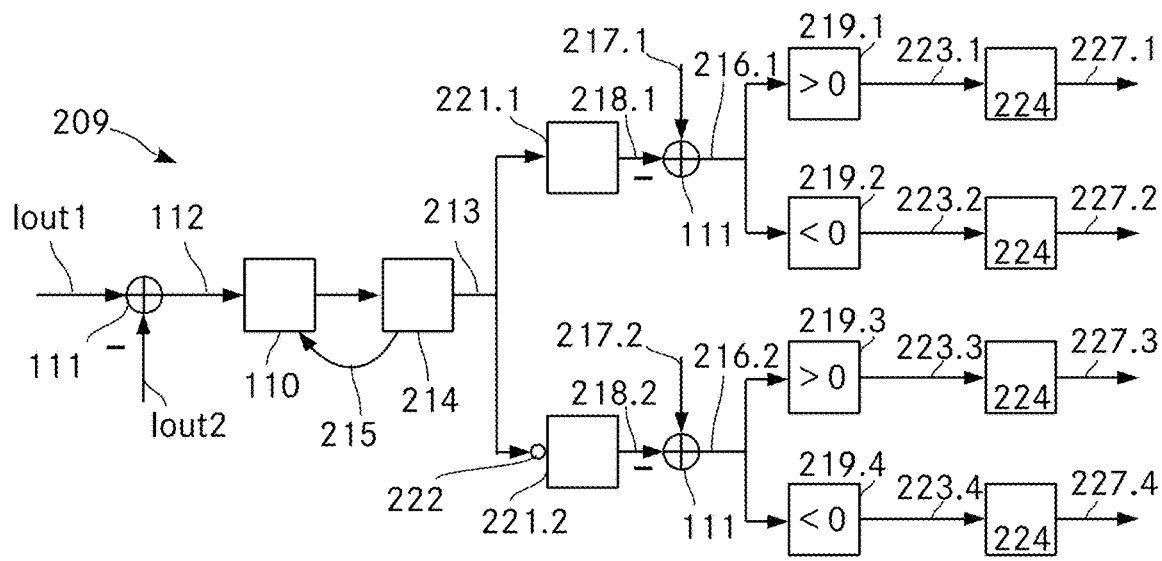
FIG. 11 a schematic representation of a controller according to the invention for use in an interleaved LLC converter with two parallel LLC converters each having a half bridge inverter.

FIG. 11 shows a controller 209 according to the invention for use in an interleaved LLC converter with two parallel LLC converters each having a half bridge inverter.

Again, the output current Iout1, Iout2 of each of the two LLC converters serves as an input for the controller 209. Again, the output currents Iout1, Iout2 are averaged values of these output currents. The adder 111 forms an error signal 112 by subtracting the output current Iout2 of the inverter of the second LLC converter from the output current Iout1 of the inverter of the first LLC converter. This error signal 112 is fed to a PI compensator 110. In this example, the controller 209 further includes an anti-windup device that is formed by the PI compensator and a limiter 214. The limiter 214 that prevents further accumulation of the error signal 112 by the integral part of the PI compensator 110 in case the PI compensator 110 enters or is in the limiters saturation range. The limiter 214 limits the output of the PI compensator 110 for too high magnitudes of both the positive and the negative values. The influence of the limiter 214 on the PI compensator is indicated by the arrow 215.

The controller 209 includes two different paths where each path is adapted to provide the switch control signals for the single leg of the inverter of one particular LLC converter. The upper path receives the limited bipolar duty cycle value 213 and a further limiter 221.1 limits the bipolar duty cycle value 213 to positive values, which corresponds to the portion of the bipolar duty cycle value 213 that is above zero, in particular between zero and the upper limiting value of the limiter 214. This limited output signal is designated as upper intermediate duty cycle value 218.1 and is provided at the output of the limiter 221.1.

The lower path receives the inverted limited bipolar duty cycle value 213, where the inversion of the bipolar duty cycle value 213 is indicated by the inverter 222. A further limiter 221.2 then limits the inverted bipolar duty cycle value 213 to positive values, which corresponds to the inverted portion of the bipolar duty cycle value 213 that is below zero, in particular between zero and the lower limiting value of the limiter 214. This limited output signal is designated as lower intermediate duty cycle value 218.2 and is provided at the output of the limiter 221.2.

The absolute values of the upper and the lower limiting value of the limiter 214 are usually identical.

In the upper path, an adder 111 forms a first comparison signal 216.1 by subtracting the upper intermediate duty cycle value 218.1 from a first carrier signal 217.1. In this example too, the carrier signal 217.1 is a regular triangular signal having a particular frequency. The first comparison signal 216.1 is fed to two different comparators 219.1, 219.2 where the first comparator 219.1 produces a first comparator output 223.1 which is outputted as a positive signal if the first comparison signal 216.1 is above zero and which is outputted as a zero signal otherwise. The first comparator output 223.1 is then fed to a dead time device 224 which inserts a dead time into the first comparator output 223.1 such that the rising edge of the first comparator output 223.1 is slightly delayed in the finally outputted switch control signal 227.1. Such a dead time or interlock delay prevents the two switches of the same leg from being closed at the same time, which would cause a short circuit.

The second comparator 219.2 produces a second comparator output 223.2 which is outputted as a positive signal if the first comparison signal 216.1 is below zero and which is outputted as a zero signal otherwise. The second comparator output 223.2 is then fed to a dead time device 224 which again inserts a dead time similar to the first comparator output 223.1 and then outputs the final switch control signal 227.2.

In the lower path, an adder 111 forms a second comparison signal 216.2 by subtracting the output of the limiter 221.2 from a second carrier signal 217.2. Again, the carrier signal 217.2 is a regular triangular signal having a particular frequency but is shifted by +90° compared to the first carrier signal 217.1. The second comparison signal 216.2 is fed to two different comparators 219.3, 219.4 where the first comparator 219.3 produces a third comparator output 223.3 which is outputted as a positive signal if the second comparison signal 216.2 is above zero and which is outputted as a zero signal otherwise. The third comparator output 223.3 is then fed to a dead time device 224 which inserts a dead time into the third comparator output 223.3 such that the rising edge of the third comparator output 223.3 is slightly delayed in the finally outputted switch control signal 227.3.

The fourth comparator 219.4 produces a fourth comparator output 223.4 which is outputted as a positive signal if the second comparison signal 216.2 is below zero and which is outputted as a zero signal otherwise. The fourth comparator output 223.4 is then fed to a dead time device 224 which again inserts a dead time similar to the third comparator output 223.3 and then outputs the final switch control signal 227.4. If the absolute value of the upper limiting value of the limiter 214 is defined to have a value of 1, the triangular carrier signals 217.1, 217.2 are provided with an amplitude of 0.5. Accordingly, if the error signal 112 is zero, the bipolar duty cycle value 213 and therewith also the upper intermediate duty cycle value 218.1, and the lower intermediate duty cycle value 218.2 are zero as well. Then, the first and second comparison signals 216.1, 216.2 correspond to the carrier signals 217.1, 217.2 respectively which leads to switch control signals 227.1, 227.2, 227.3, 227.4 with a duty cycle of 0.5. If however the error signal 112 is different from zero, the bipolar duty cycle value 213 and therewith also one of the upper intermediate duty cycle value 218.1 or the lower intermediate duty cycle value 218.2 are different from zero, which leads to switch control signals in that path with a duty cycle different from 0.5. The other one of the upper intermediate duty cycle value 218.1 or the lower intermediate duty cycle value 218.2 is zero which leads to switch control signals in that path with a duty cycle of 0.5.

Although the controller 209 uses the output currents of the LLC converters as input, it is also possible that the averaged input current of each of the two converters is used as an input for the controller 209.

Figure 12:
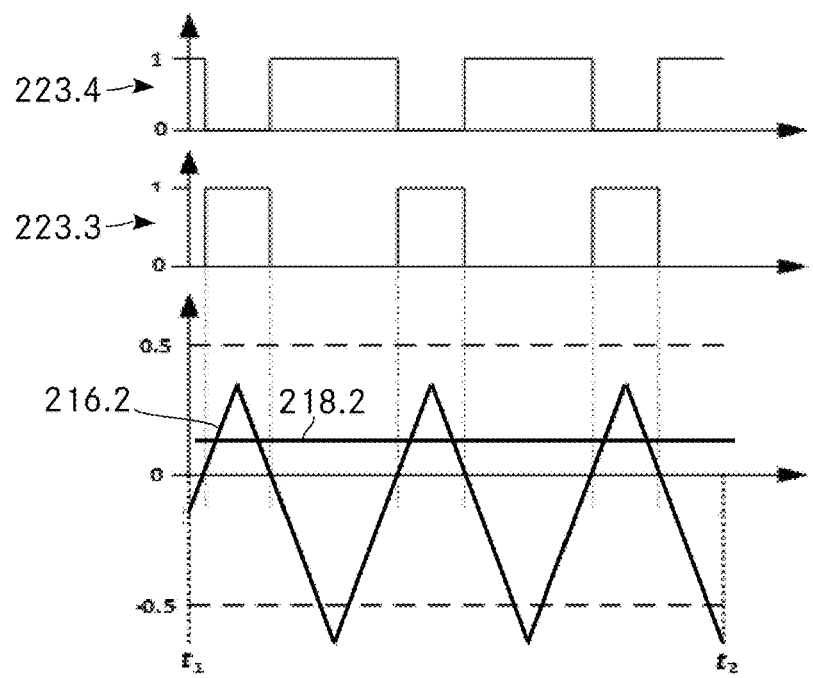
FIG. 12 a schematic timing diagram of some values of the controller shown in FIG. 11.

FIG. 12 shows a schematic timing diagram of some values of the controller 209 shown in FIG. 11. In the example shown, the output current Iout2 of the second LLC converter is higher than the output current Iout1 of the first LLC converter such that the output current Iout2 of the second LLC converter has to be reduced in order to balance the two LLC converters.

The error signal 112 becomes negative wherefore the lower intermediate duty cycle value 218.2 takes a positive value as shown in FIG. 12 and the upper intermediate duty cycle value 218.1 remains zero. Accordingly, the first comparison signal 216.1 is identical to the carrier signal 217.1 which in turn means that the final switch control signals 227.1, 227.2 are generated with a duty cycle of 0.5 (apart from the inserted dead time). But the second comparison value 216.2 corresponds to the carrier signal 217.2 lowered by the amount of the upper intermediate duty cycle value 218.2 as shown in FIG. 12. The resulting comparator outputs 223.3, 223.4 are shown in FIG. 12 as well where the comparator output 223.3 has a duty cycle below 0.5 and the comparator output 223.4 has a duty cycle above 0.5. In this example, the resulting switch control signals 227.1, 227.2 are used for controlling the switches of the first LLC converter and the resulting switch control signals 227.3, 227.4 are used for controlling the switches of the second LLC converter such that the power transfer of the second LLC converter is lowered which in turn balances the power transfer of the two LLC converters as required.

The ordinate axis of FIG. 12 shows the time in microseconds and the abscissa axes show the amplitudes scaled to 1 which means that the comparator outputs 223.3, 223.4 are between zero and 1 and that the second comparison signal 216.2 is between plus and minus 1.

Figure 13:
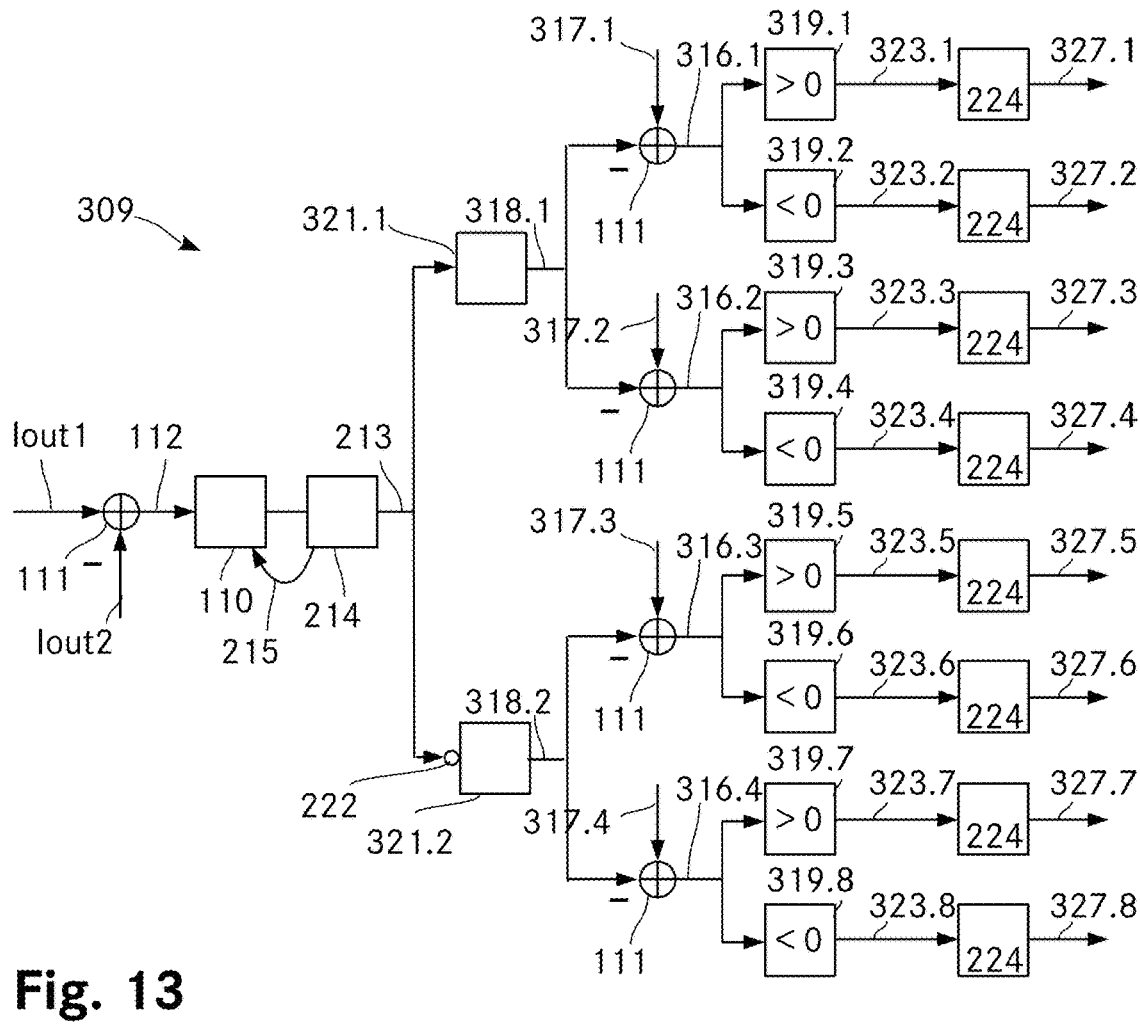
FIG. 13 a schematic representation of another controller according to the invention for use in an interleaved LLC converter with two parallel LLC converters each having a full bridge inverter.

FIG. 13 shows a schematic representation of another controller 309 according to the invention. The controller 309 may for example be used in an interleaved LLC converter with two LLC converters each having a full bridge inverter such as for example shown in FIG. 3 and being operated with freewheeling intervals such as shown in FIG. 6 and described in the description thereto. In connection with the controller 309, the switches of the full bridge inverter of the second LLC converter are designated as switches S1, S2, S3 and S4 as numbered in FIG. 3. And the switches of the full bridge inverter of the first LLC converter are designated as switches S5, S6, S7 and S8 analogous to the switch numbering in FIG. 3.

Again, it is assumed that the second LLC converter is transferring more power than the first LLC converter. Accordingly, the second LLC converter has to be operated with a duty cycle different from 0.5 and the first LLC converter is operated with a duty cycle of 0.5 which leads to a power balancing as required.

The first part of controller 309, i. e. including the generation of the error signal 112 by subtracting the mean value of the output current Iout2 of the second LLC converter from the mean value of the output current Iout1 of the first LLC converter, determining a bipolar duty cycle value 213 via a PI compensator and a limiter and determining an upper intermediate duty cycle value 318.1 and a lower intermediate duty cycle value 318.2 is identical to the controller 209 shown in FIG. 11 and described in connection therewith.

However, as more switches have to be controlled in this example, the second part of the controller 309 differs from controller 209. The upper intermediate duty cycle value 318.1 is not fed to a single adder but to two different adders 111 where the upper intermediate duty cycle value 318.1 is subtracted from a carrier signal 317.1 and 317.2 respectively thereby providing the first and second comparison signals 316.1, 316.2 respectively. Again, the carrier signal 317.1 is a regular triangular signal having a particular frequency and an amplitude of 0.5 compared with the limiting values of the limiter 214. The carrier signal 317.2 is the same as the carrier signal 317.1 but shifted by an angle of 180°.

Similarly, the lower intermediate duty cycle value 318.2 is subtracted from two carrier signals 317.3 and 317.4 respectively thereby providing a third and fourth comparison signals 316.3, 316.4 respectively. The carrier signals 317.3, 317.4 are regular triangular signals as well having the same frequency and amplitude as the other carriers. But the carrier signal 317.3 is shifted in relation to carrier signal 317.1 by an angle of 90° and the carrier signal 317.4 is shifted in relation to carrier signal 317.1 by an angle of 270°.

As in controller 209, the first comparison signal 316.1 is fed to two different comparators 319.1, 319.2 and the second comparison signal 316.2 is fed to two different comparators 319.3, 319.4. In the lower half of controller 309, the third comparison signal 316.3 is fed to comparators 319.5, 319.6 and the fourth comparison signal 316.4 is fed to comparators 319.7, 319.8. The comparators 319.1-319.8 generate the corresponding comparator outputs 323.1, 323.2, 323.3, 323.4, 323.5, 323.6, 323.7, 323.8 in the same way as described in connection with controller 209 and the final switch control signals 327.1, 327.2, 327.3, 327.4, 327.5, 327.6, 327.7, 327.8 are also generated in the same way as described in connection with controller 209 by inserting a dead time.

In this embodiment, the resulting switch control signals are used for controlling the switches of the first and second LLC converters as follows:
switch control signal 327.1 is used to control switch S6,
switch control signal 327.1 is used to control switch S8,
switch control signal 327.3 is used to control switch S5,
switch control signal 327.4 is used to control switch S7,
switch control signal 327.5 is used to control switch S2,
switch control signal 327.6 is used to control switch S4,
switch control signal 327.7 is used to control switch S1,
switch control signal 327.8 is used to control switch S3.

In this embodiment, the error signal 112 becomes negative wherefore the lower intermediate duty cycle value 318.2 takes a positive value and the upper intermediate duty cycle value 318.1 remains zero. Accordingly, the switch control signals 327.1-327.4 become 0.5 which means that the first LLC converter with the switches S5-S8 is operated with a duty cycle of 0.5.

And as described in connection with controller 209, the switch control signals 327.5-327.8 do have the same duty cycle different from 0.5 but shifted against each other according to the shift of the corresponding carrier signals. And as previously outlined, the switch control signals 327.5 is below 0.5 and the switch control signal 327.6 is above 0.5 by the same amount such that the switches S2, S4 of the same leg of the second full bridge inverter are operated complementarily. The same applies to switch control signals 327.7 and 327.8 for operating the switches S1, S3 of the other leg of the second full bridge inverter.

Accordingly, the power transfer of the second LLC converter is lowered which in turn balances the power transfer of the two LLC converters as required.

Although the controller 309 uses the output currents of the LLC converters as input, it is also possible that the averaged input current of each of the two converters is used as an input for the controller 309.

In summary, it is to be noted that the invention enables to provide a method for balancing the power transfer in an interleaved LLC converter arrangement with two or more LLC converters connected in parallel and a corresponding controller that may be used in LLC converters with a full bridge or a half bridge inverters at the input side and that do not require additional components.

The invention claimed is:

1. A method for balancing a power transfer of an interleaved LLC converter arrangement with two or more LLC converters from an input side to an output side, wherein the two or more LLC converters include a first LLC converter and a second LLC converter connected in parallel on the input side and on the output side, wherein each LLC converter includes an inverter with a bridge having one or two legs at the input side, a resonant tank connected to the inverter, a transformer with a primary and a secondary and an output rectifier, wherein the primary of the transformer is connected to the resonant tank and the output rectifier is connected to the secondary of the transformer, wherein the power transfer is balanced by operating each leg of the bridge of the inverter of the first LLC converter with a duty cycle of 0.5, operating at least one leg of the bridge of the inverter of the second LLC converter that transfers more power from the input side to the output side than the first LLC converter with a duty cycle different from 0.5, operating a first switch of said at least one leg with a duty cycle that is greater than 0.5 and operating a second switch of said at least one leg with a duty cycle that is smaller than 0.5.

2. The method according to claim 1, wherein the bridge of the inverter of the second LLC converter is a half bridge that is formed by said at least one leg.

3. The method according to claim 1, wherein the bridge of the inverter of the second LLC converter is a full bridge and wherein a first leg of said full bridge is formed by said at least one leg.

4. The method according to claim 3, including operating a second leg of said full bridge with a duty cycle of 0.5.

5. The method according to claim 3, including operating a second leg of said full bridge with a duty cycle different from 0.5.

6. The method according to claim 5, including operating the first leg and the second leg such as to provide at least one freewheeling interval.

7. The method according to claim 3, wherein the bridge of the inverter of the first LLC converter is a full bridge with two legs and wherein both legs are operated with a duty cycle of 0.5.

8. The method according to claim 1, including generating switch control signals for operating the at least one leg using a closed PI control loop based on a feedback of an output or an input current of each LLC converter.

9. The method according to claim 1, including providing an output power of the interleaved LLC converter arrangement across an output capacitor connected across the output side.

10. A controller for balancing a power transfer of an interleaved LLC converter arrangement with two or more LLC converters from an input side to an output side, wherein the two or more LLC converters include a first LLC converter and a second LLC converter connected in parallel on the input side and on the output side, each LLC converter including an inverter with a bridge having one or two legs at the input side, a resonant tank connected to the inverter, a transformer with a primary and a secondary and an output rectifier, the primary of the transformer being connected to the resonant tank and the output rectifier being connected to the secondary of the transformer, wherein the controller is adapted to balance the power transfer by operating each leg of the bridge of the inverter of the first LLC converter with a duty cycle of 0.5, operating at least one leg of the bridge of the inverter of the second LLC converter that transfers more power from the input side to the output side than the first LLC converter with a duty cycle different from 0.5, operating a first switch of said at least one leg with a duty cycle that is greater than 0.5 and operating a second switch of said at least one leg with a duty cycle that is smaller than 0.5.

11. The controller according to claim 10, wherein the controller is adapted to generate respective switch control signals for each switch of the bridge of the inverter of the first LLC converter as well as for each switch of the bridge of the inverter of the second LLC converter and to provide these switch control signals to a respective control input of said switches.

12. The controller according to 11, wherein the controller includes a first input to receive information representative of an output current of the first LLC converter and a second input to receive information representative of an output current of the second LLC converter and wherein the controller is adapted to generate the switch control signals in dependency of the information received at the first and second input.

13. An interleaved LLC converter arrangement for transferring power from an input side to an output side, including a first LLC converter and a second LLC converter connected in parallel on the input side and on the output side, and wherein each LLC converter includes an inverter with a bridge having one or two legs at the input side, a resonant tank connected to the inverter, a transformer with a primary and a secondary and an output rectifier wherein the primary of the transformer is connected to the resonant tank and the output rectifier is connected to the secondary of the transformer, wherein the interleaved LLC converter arrangement includes a controller for balancing a power transfer of an interleaved LLC converter arrangement with two or more LLC converters from an input side to an output side, wherein the two or more LLC converters include a first LLC converter and a second LLC converter connected in parallel on the input side and on the output side, each LLC converter including an inverter with a bridge having one or two legs at the input side, a resonant tank connected to the inverter, a transformer with a primary and a secondary and an output rectifier, the primary of the transformer being connected to the resonant tank and the output rectifier being connected to the secondary of the transformer, wherein the controller is adapted to balance the power transfer by operating each leg of the bridge of the inverter of the first LLC converter with a duty cycle of 0.5, operating at least one leg of the bridge of the inverter of the second LLC converter that transfers more power from the input side to the output side than the first LLC converter with a duty cycle different from 0.5, operating a first switch of said at least one leg with a duty cycle that is greater than 0.5 and operating a second switch of said at least one leg with a duty cycle that is smaller than 0.5.

14. The interleaved LLC converter arrangement according to claim 13, including an output capacitor connected across the output side of the interleaved LLC converter.

15. The interleaved LLC converter arrangement according to claim 13, wherein the controller is adapted to generate respective switch control signals for each switch of the bridge of the inverter of the first LLC converter as well as for each switch of the bridge of the inverter of the second LLC converter and to provide these switch control signals to a respective control input of said switches.

16. The interleaved LLC converter arrangement according to claim 13, wherein the controller includes a first input to receive information representative of an output current of the first LLC converter and a second input to receive information representative of an output current of the second LLC converter and wherein the controller is adapted to generate the switch control signals in dependency of the information received at the first and second input.

* * * * *